US010185574B2

(12) United States Patent
Kamalamma et al.

(10) Patent No.: US 10,185,574 B2
(45) Date of Patent: Jan. 22, 2019

(54) LIVE IMAGING OF A DEVICE

(71) Applicant: Wyse Technology L.L.C., Santa Clara, CA (US)

(72) Inventors: Kabilraj Upendran Kamalamma, Thiruvananthapuram (IN); Jyothi Bandakka Nanjappa, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 233 days.

(21) Appl. No.: 15/158,892

(22) Filed: May 19, 2016

(65) Prior Publication Data

US 2017/0337065 A1    Nov. 23, 2017

(51) Int. Cl.
*G06F 9/4401* (2018.01)

(52) U.S. Cl.
CPC ............ *G06F 9/441* (2013.01); *G06F 9/4418* (2013.01)

(58) Field of Classification Search
CPC ...................................................... G06F 8/656
See application file for complete search history.

(56) References Cited

U.S. PATENT DOCUMENTS

| | | | | |
|---|---|---|---|---|
| 6,920,555 B1* | 7/2005 | Peters | ................... | G06F 9/4451 711/173 |
| 8,745,601 B1* | 6/2014 | Carlson | ................... | G06F 9/445 717/134 |
| 2008/0010639 A1* | 1/2008 | Bestmann | ................ | G06F 8/63 718/100 |
| 2008/0250254 A1* | 10/2008 | Bendapudi | ............ | G06F 9/4451 713/300 |
| 2013/0167140 A1* | 6/2013 | Androncik | ................ | G06F 8/61 717/175 |
| 2015/0007270 A1* | 1/2015 | Walker | ................ | G06F 9/45558 726/4 |
| 2015/0169329 A1* | 6/2015 | Barrat | ....................... | G06F 8/67 713/2 |

* cited by examiner

*Primary Examiner* — Kim Huynh
*Assistant Examiner* — Joshua Neveln
(74) *Attorney, Agent, or Firm* — Kirton McConkie; Brian Tucker

(57) ABSTRACT

Live imaging of a device can be performed. A client device can include at least two drives that are alternately employed to store the active OS partition. An imaging solution that executes on the active OS partition on a first drive can perform a live imaging process in which a second drive is fully imaged while the user continues to use the client device. Then, once the imaging of the second drive has been completed, the client device can be rebooted to cause the client device to boot from the second drive. In this way, the only downtime that a user may experience due to the imaging process is during the reboot. In a similar manner, when a client device includes only a single available drive, the drive can be divided into two or more sets of one or more partitions that are alternately employed as the active OS partition(s).

19 Claims, 10 Drawing Sheets

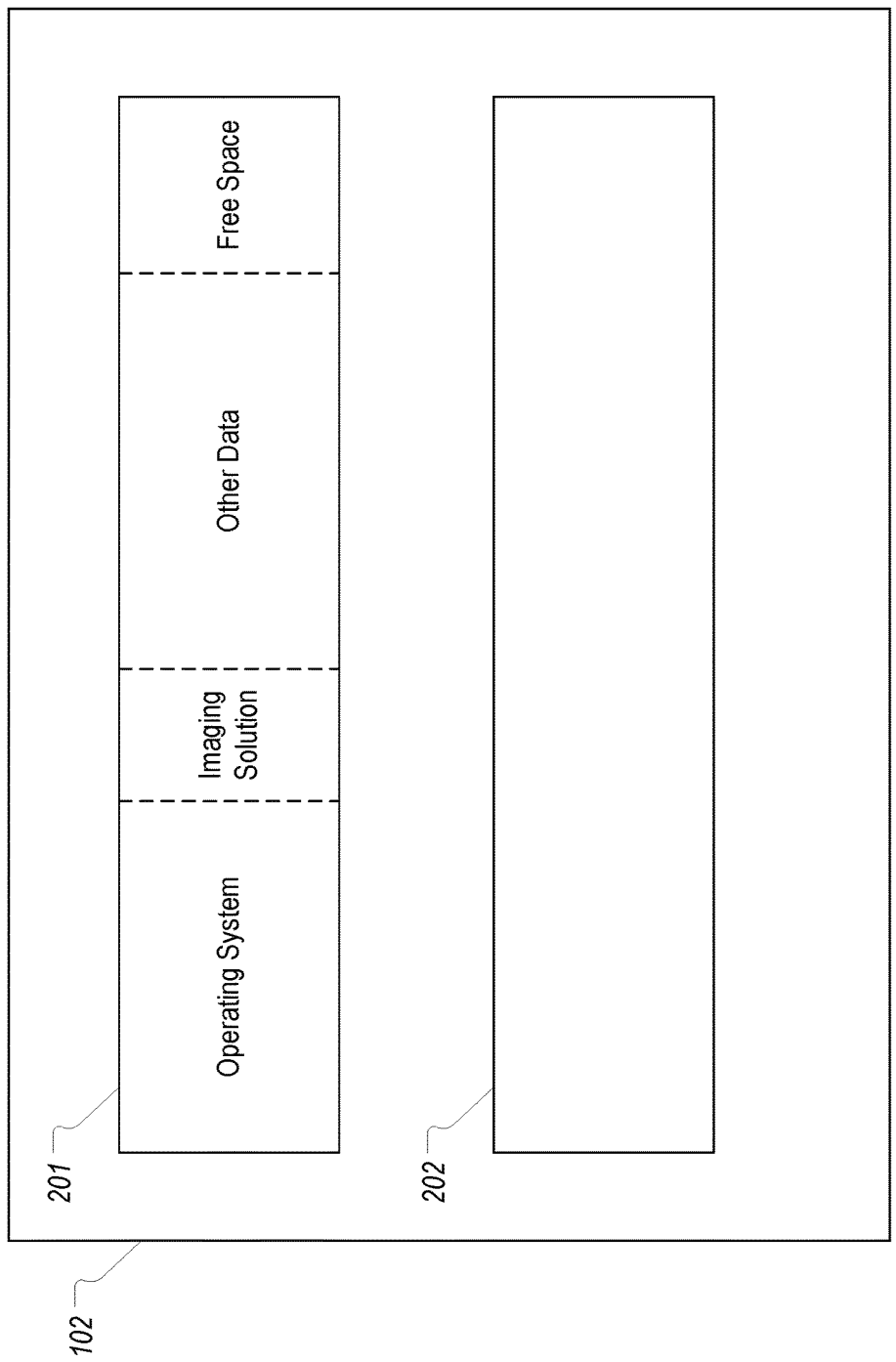

600

601

While A First Operating System That Is Included In A First Image On A First Set Of One Or More Partitions Of A Drive Of The Client Device Is Executing, Obtain, By An Imaging Solution That Is Executed By The First Operating System, A Second Image That Includes A Second Operating System

602

While The First Operating System Continues To Execute, Write The Second Image To A Second Set Of One Or More Partitions Of A Drive Of The Client Device To Cause The Second Set Of One Or More Partitions To Be Capable Of Booting The Second Operating System

603

While The First Operating System Continues To Execute, Update The Client Device To Cause The Client Device To Boot From The Second Set Of One Or More Partitions

604

Reboot The Client Device To Cause The Second Operating System To Be Executed

FIG. 6

LIVE IMAGING OF A DEVICE

CROSS-REFERENCE TO RELATED APPLICATIONS

N/A

BACKGROUND

Autogenic imaging is a technique for imaging a device with the image residing in a backup partition of the device's flash or hard drive. Typically, a device that is configured to be updated via Autogenic imaging will have a drive that includes at least three partitions: (1) a boot agent partition where the imaging solution resides; (2) the active operating system (OS) partition; and (3) the backup partition. The benefit of Autogenic imaging is that the image is downloaded to the backup partition in the background. Therefore, the image can be downloaded to the device while the device is being used thus reducing the downtime required to image the device.

However, once the image is downloaded to the backup partition and it is desired to deploy the image, the device must be restarted to boot from the boot agent partition thereby allowing the imaging solution on that partition to perform the imaging operation on the OS partition (i.e., to copy the image from the backup partition to the OS partition). While the imaging solution performs this function, the device will not be usable (because the boot agent partition only includes a minimal kernel sufficient to perform the imaging operation). Also, because the new image is written to the OS partition, the previous contents of the OS partition will be lost possibly including any user data that was stored on the OS partition. Further, even though the backup partition is logically separate from the OS partition, they reside on the same drive. Therefore, if there is a drive or boot failure, it will not be possible to image the device remotely (which is how many thin client and other managed devices are imaged). Additionally, if the imaging process fails for some reason, there will be no fall back mechanism since the contents of the OS partition will have been modified during the process. Finally, even if the imaging process completes successfully, it may still be necessary for any user profile that was previously applied to the device to be recreated. This is especially true when the imaging involves an upgrade to a newer version of the operating system.

BRIEF SUMMARY

The present invention extends to methods, systems, and computer program products for performing live imaging of a device. A client device can include at least two drives that are alternately employed to store the active OS partition. An imaging solution that executes on the active OS partition on a first drive can perform a live imaging process in which a second drive is fully imaged while the user continues to use the client device. Then, once the imaging of the second drive has been completed, the client device can be rebooted to cause the client device to boot from the second drive. In this way, the only downtime that a user may experience due to the imaging process is during the reboot. Similarly, if a device only includes a single drive, the present invention can still be implemented by dividing the drive into two or more sets of one or more partitions that are alternately employed as the active OS partition(s).

In some embodiments, the present invention is implemented as a method for performing live imaging of a client device. While a first operating system that is included in a first image on a first set of one or more partitions of a drive of the client device is executing, an imaging solution that is executed by the first operating system can obtain a second image that includes a second operating system. While the first operating system continues to execute, the imaging solution can write the second image to a second set of one or more partitions of a drive of the client device to cause the second set of one or more partitions to be capable of booting the second operating system and then update the client device to cause the client device to boot from the second set of one or more partitions. The client device can then be rebooted to cause the second operating system to be executed.

In other embodiments, the present invention is implemented as computer storage media storing computer executable instructions which when executed on a client device implement a method for performing live imaging of the client device. The method can include: obtaining, by an imaging solution that is executed on a first operating system that is installed on a first set of one or more partitions of a drive of the client device, a new image that includes a second operating system; writing, by the imaging solution, the second image to a second set of one or more partitions of a drive of the client device to cause the second set of one or more partitions to be capable of booting the second operating system; and causing, by the imaging solution, the client device to reboot from the second set of one or more partitions such that the second operating system is executed.

In other embodiments, the present invention is implemented as a client device that includes: a first drive containing a first image, the first image including a first operating system and an imaging solution; a second drive; and one or more processors configured to execute the first operating system. While the first operating system is executed, the imaging solution obtains and writes a second image containing a second operating system to the second drive to cause the client device to be capable of rebooting directly from the first operating system to the second operating system.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 2A-2C illustrate how the live imaging process of the present invention can be implemented to image a second drive with a new operating system while the operating system on a first drive is executing;

FIG. 6 illustrates a flowchart of an example method for performing live imaging of a client device.

DETAILED DESCRIPTION

Figure 1:
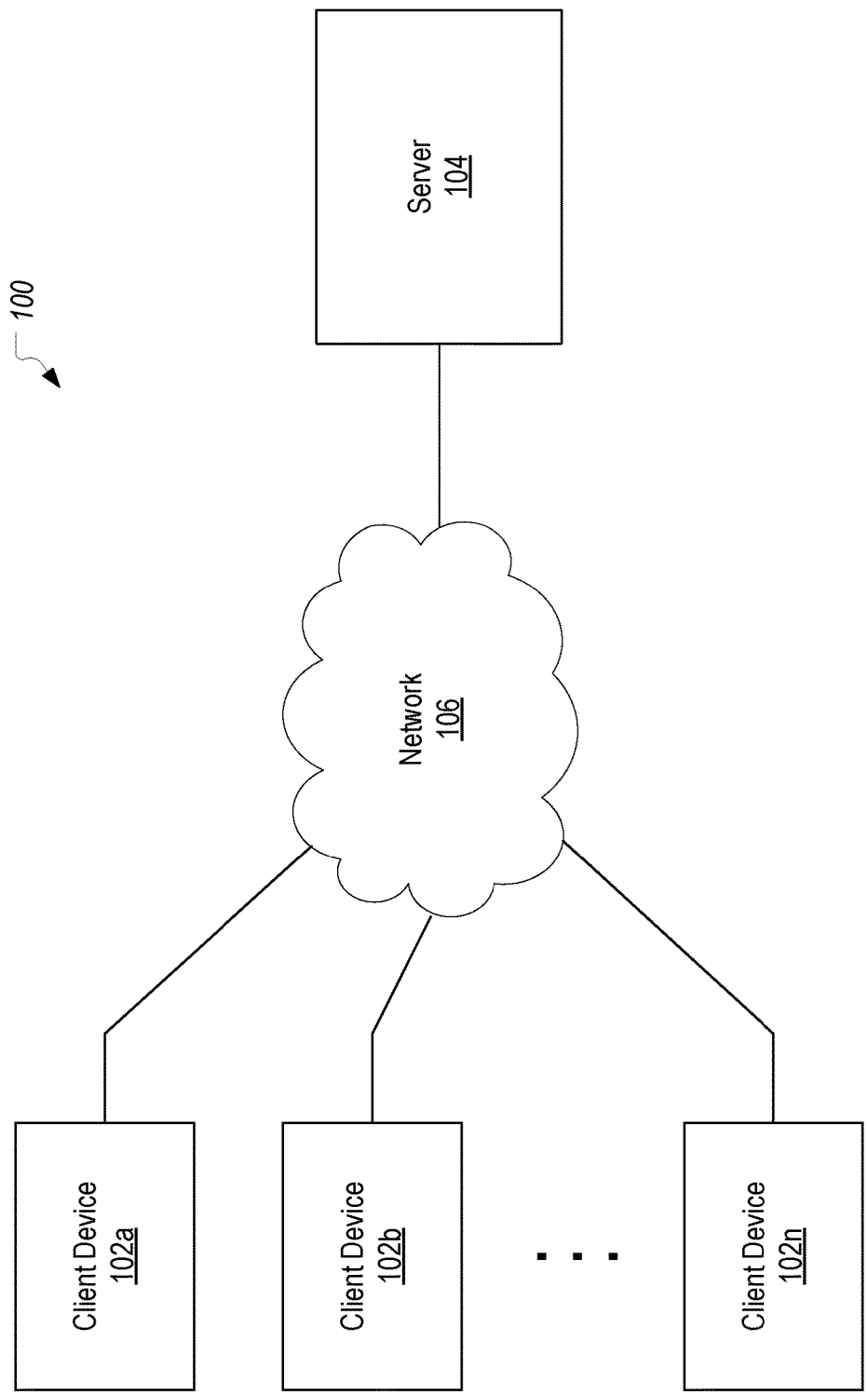
FIG. 1 illustrates an example computing environment in which the present invention can be implemented.

FIG. 1 illustrates an example computing environment 100 in which the present invention can be implemented. Computing environment 100 includes a number of client devices 102a-102n that are interconnected with a server 104 via a network 106. Client devices 102a-102n (or generally client device 102) can typically be thin or zero client devices that are managed by server 104. However, the present invention can also be implemented when client devices 102a-102n are any type of device that is capable of being imaged. Network 106 can represent any number and type of networks including a local area network and/or the internet. Server 104 can act as a repository for images such that client devices 102a-102n can download an image from server 104. Server 104 may also function to manage client devices 102a-102n. Although a single server 104 is depicted, any number of servers can be employed for managing and deploying images to client devices 102a-102n. In some embodiments, a cloud-based management server may be employed to manage client devices 102a-102n while a local server may be employed as the repository for downloading images to the client devices. In some embodiments, a client device 102 may obtain an image from another client device 102 (i.e., in a peer-to-peer fashion). Accordingly, the exact architecture of computing environment 100 is not essential to the invention.

Figure 2B:
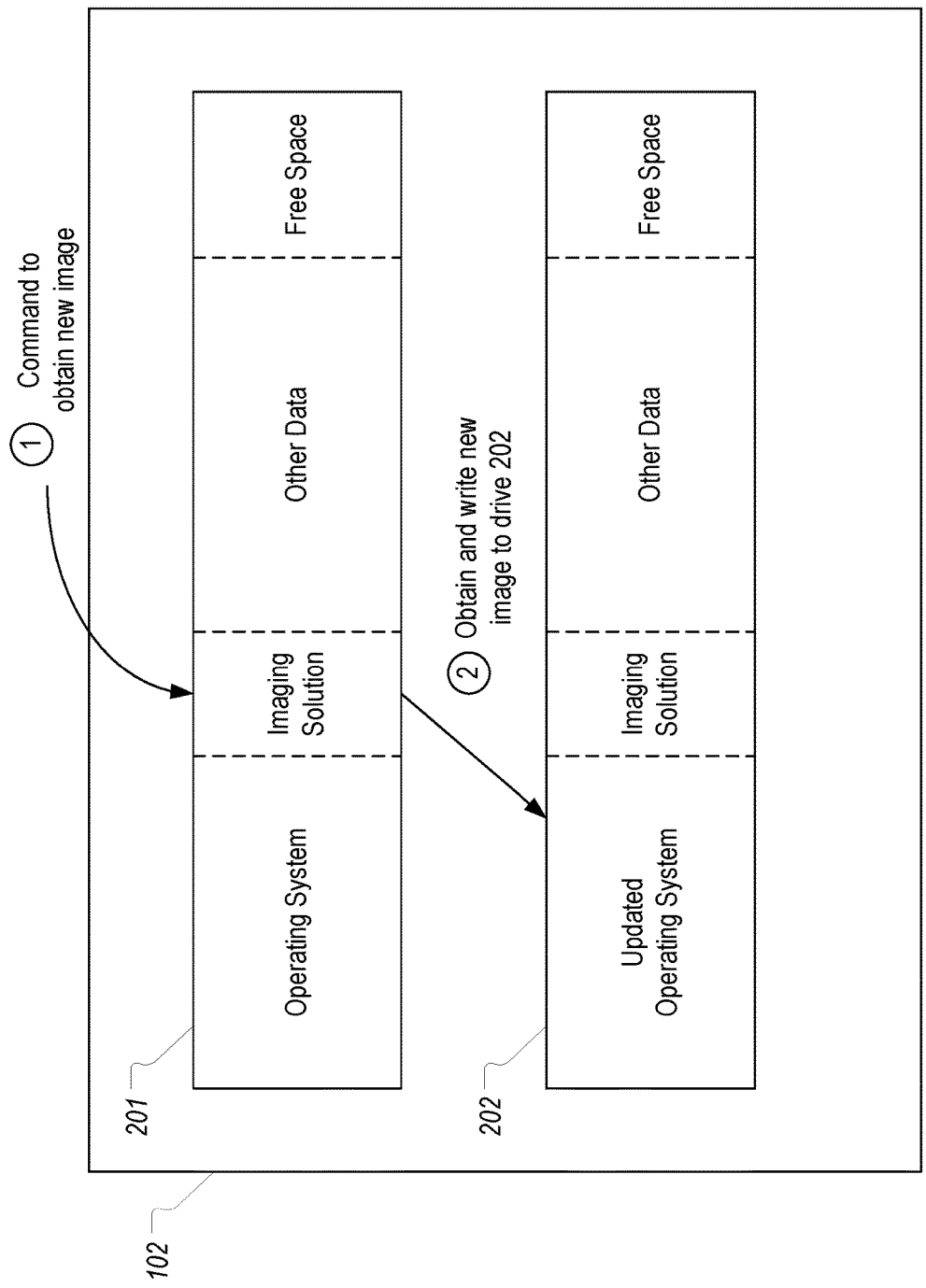
Figure 2C:
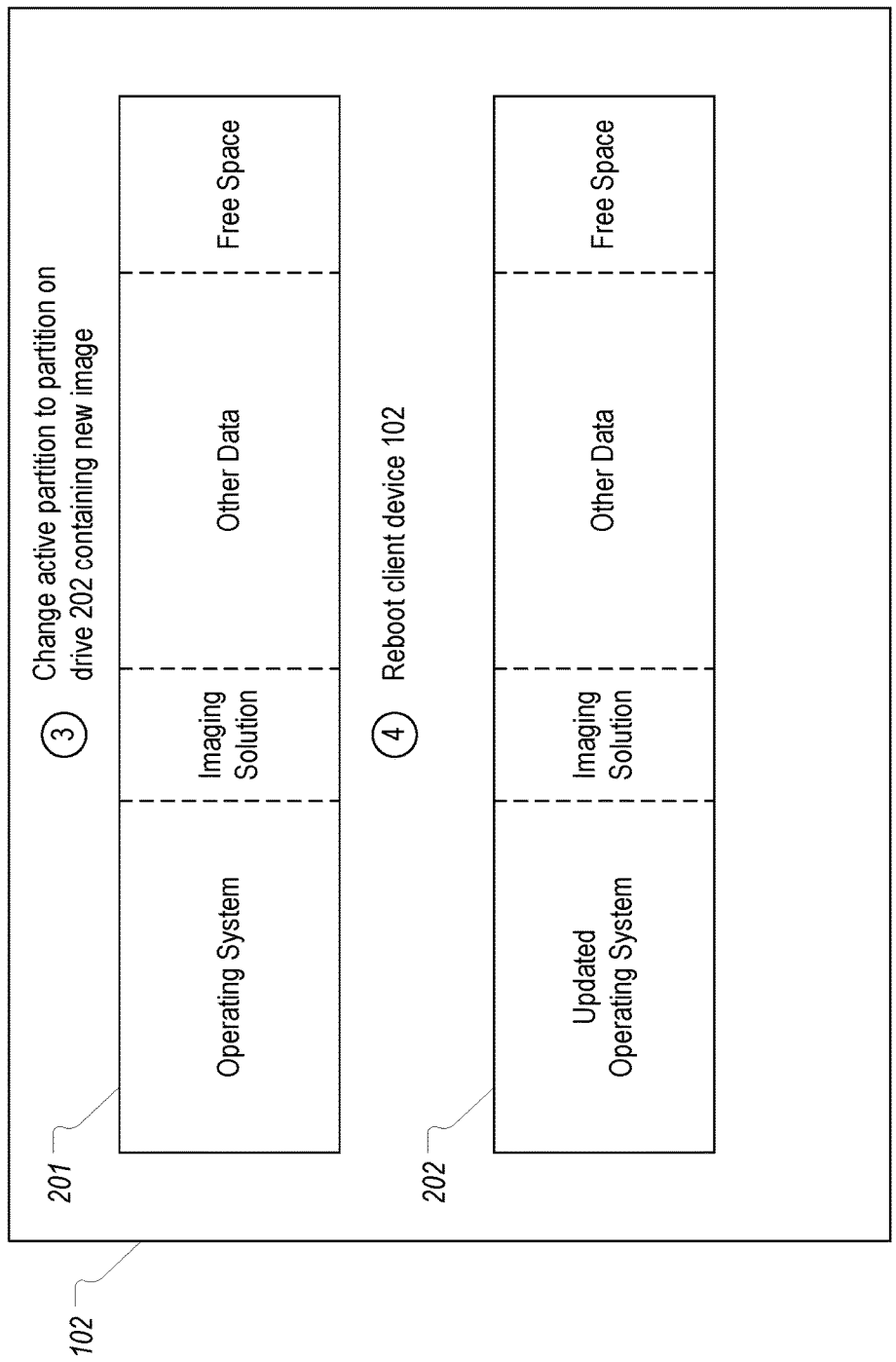

FIGS. 2A-2C illustrate an example architecture of client device 102. As shown, a client device 102 can include two drives 201 and 202. Drives 201 and 202 can be any type of drive, such as a hard drive or a flash drive, that is capable of storing an OS partition. For ease in illustration, drives 201 and 202 are depicted as including a single partition. However, either of these drives could include a number of partitions.

In FIG. 2A, it will be assumed that drive 201 is the active drive and therefore stores the operating system for client device 102. At this point, it will be assumed that drive 202 does not store any content; however, drive 202 could include any type of content including an inactive operating system (e.g., an older version of the operating system employed on client device 102).

Drive 201 is also shown as including an imaging solution that is stored on the same partition as the operating system (or that is at least accessible from the OS partition) so that the imaging solution can be executed while the operating system is executing. In other words, because the imaging solution is not part of a separate boot agent partition, the imaging solution can execute while the user is actively using client device 102. For illustrative purposes only, drive 201 is also shown as including other data and free space. This other data can be any type of data including user applications, user data, etc.

Turning to FIG. 2B, the imaging solution that is executed by the operating system on drive 201 can receive a command to obtain a new image. For example, this command can be received from server 104 and could include information defining where to obtain the new image (e.g., a URL). In response to receiving this command, the imaging solution can obtain the new image and write it to drive 202 (e.g., using Merlin imaging techniques). This process of writing the new image to drive 202 can be performed while the operating system on drive 201 continues to execute (i.e., without restarting client device 102 to boot into a separate boot agent partition). In other words, while the imaging solution is writing the new image to drive 202, the user can continue to use client device 102 in a standard manner. In some embodiments, upon receiving the command to obtain the new image, the imaging solution can prompt the user to indicate whether the imaging process should proceed at that time or should be delayed until a later time. Therefore, the imaging solution can give the user control over when resources will be utilized to perform the imaging process.

As shown in FIG. 2B, the new image can include an operating system (which in this case is assumed to be an upgraded operating system), the imaging solution (or possibly a newer version of the imaging solution), and possibly other data (e.g., user applications and/or user data). Accordingly, once the new image is written to one or more partitions of drive 202, client device 102 could be booted from drive 202 (or more particularly, from the partition on drive 202 containing the operating system). As will be further described below, in some embodiments of the invention, as part of copying the new image to drive 202, the imaging solution may also copy user settings or other configuration parameters employed by the operating system on drive 201 to drive 202 so that the updated operating system can also employ these user settings or other configuration parameters without requiring the user to manually recreate these settings in the updated operating system.

Once the imaging solution has written the new image to drive 202, drive 202 will include a bootable partition. Therefore, as shown in FIG. 2C, to complete the imaging process, the imaging solution can change the active partition to the partition on drive 202 containing the new image (or at least containing the updated operating system in cases where the new image may span more than one partition). It is again noted that each of these steps of the imaging process can be performed while the user is actively using client device 102. Finally, with the active partition updated, client device 102 can be rebooted thereby causing the updated operating system on drive 202 to be loaded. Therefore, the only downtime during the entire imaging process will occur while client device 102 reboots. Given that this reboot will occur in a relatively short amount of time, the user will experience very little downtime. Prior to rebooting client device 102, the imaging solution can notify the user that a reboot is required and allow the user to elect whether to defer the reboot to a later time. This can additionally minimize the downtime the user may experience when client device 102 is updated.

Because the new image also includes the imaging solution, this same process can be repeated at a later time to again install a new image. However, in this case, the imaging solution on drive 202 will obtain and write the new image to drive 201. In this way, imaging can alternate between the two drives so that the imaging process can always be performed while the user is actively using client device 102. Another benefit is that if the imaging process on drive 202 does not complete successfully, it will still be possible to boot from drive 201 in the same manner as before the imaging process was initiated. Similarly, any user data on drive 201 will not be overwritten when the new image is written to drive 202. Therefore, the user may continue to access the user data on drive 201 as necessary (at least until a newer image is written to drive 201). Further, if drive 202 fails for some reason, drive 201 will remain available to remotely boot client device 102.

When operating systems such as Windows are installed on a device, the operating system typically must be activated on that device. As part of this activation, an association is created between the operating system and the hardware of the device to ensure that the operating system is being employed in accordance with the relevant license. For example, this association can prevent a single copy of an operating system from being installed on multiple devices. In the case of managed devices such as thin client, this activation process can be employed to track the number of devices on which the operating system is installed.

When the imaging techniques of the present invention are employed to install an updated version of the same operating system that was already installed on the device, the imaging solution can ensure that the updated version of the operating system in the new image will be activated using the same license and/or activation code that was previously used to activate the now older version of the operating system on the client device.

Figure 3:
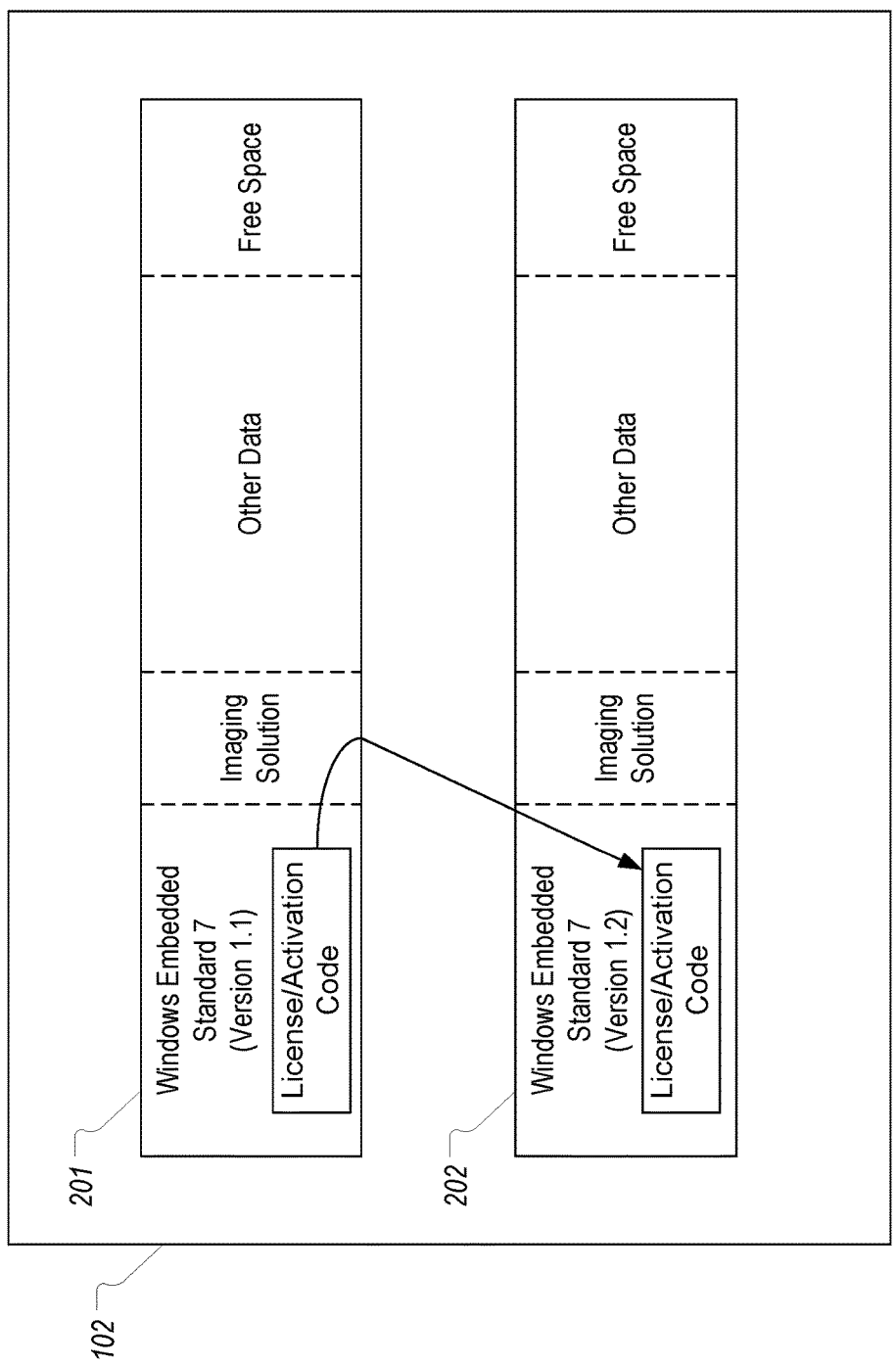
FIG. 3 illustrates how licensing data can be automatically copied to a new image as part of the live imaging process to thereby activate the operating system in the new image using the licensing data employed to activate the currently active operating system.

FIG. 3 represents how this activation can be accomplished. In this example, it is assumed that drive 201 includes version 1.1 of the Windows Embedded Standard 7 (WES7) operating system and that the new image written to drive 202 includes a version 1.2 of WES7. Because the same operating system (albeit an updated version) will continue to be used on client device 102, a new license should not be required for client device 102. However, because WES7 Version 1.2 is being installed on a different drive than WES7 Version 1.1, the activation of WES7 on drive 202 could result in a new license being required (due to the licensing being based on the underlying hardware of the device which, from WES7's perspective, will have changed).

To address this, as part of writing the new image to drive 202, the imaging solution executing from drive 201 can obtain the license, activation code, or any other similar type of licensing data that is employed when an operating system is installed (hereinafter generally referred to as "licensing data") which was used to activate WES7 Version 1.1 and again use the licensing data to activate WES7 Version 1.2 on drive 202. The imaging solution can automatically copy this licensing data in any suitable manner such as by writing the licensing data into a particular location on drive 202 where such data should be stored (e.g., within an appropriate registry entry). Then, when WES7 Version 1.2 is booted from drive 202, the updated version of the OS can be activated using the same license data that was used previously to activate WES7 Version 1.1. In this way, a new license will not be required even though it may appear that WES7 Version 1.2 has been installed on a new client device. It is noted that, when the new image includes a different operating system (e.g., Windows Embedded 8 Standard as opposed to an updated version of WES7), a different license will be required, and therefore, this copying of licensing data as part of the imaging process will not be performed.

Figure 4:
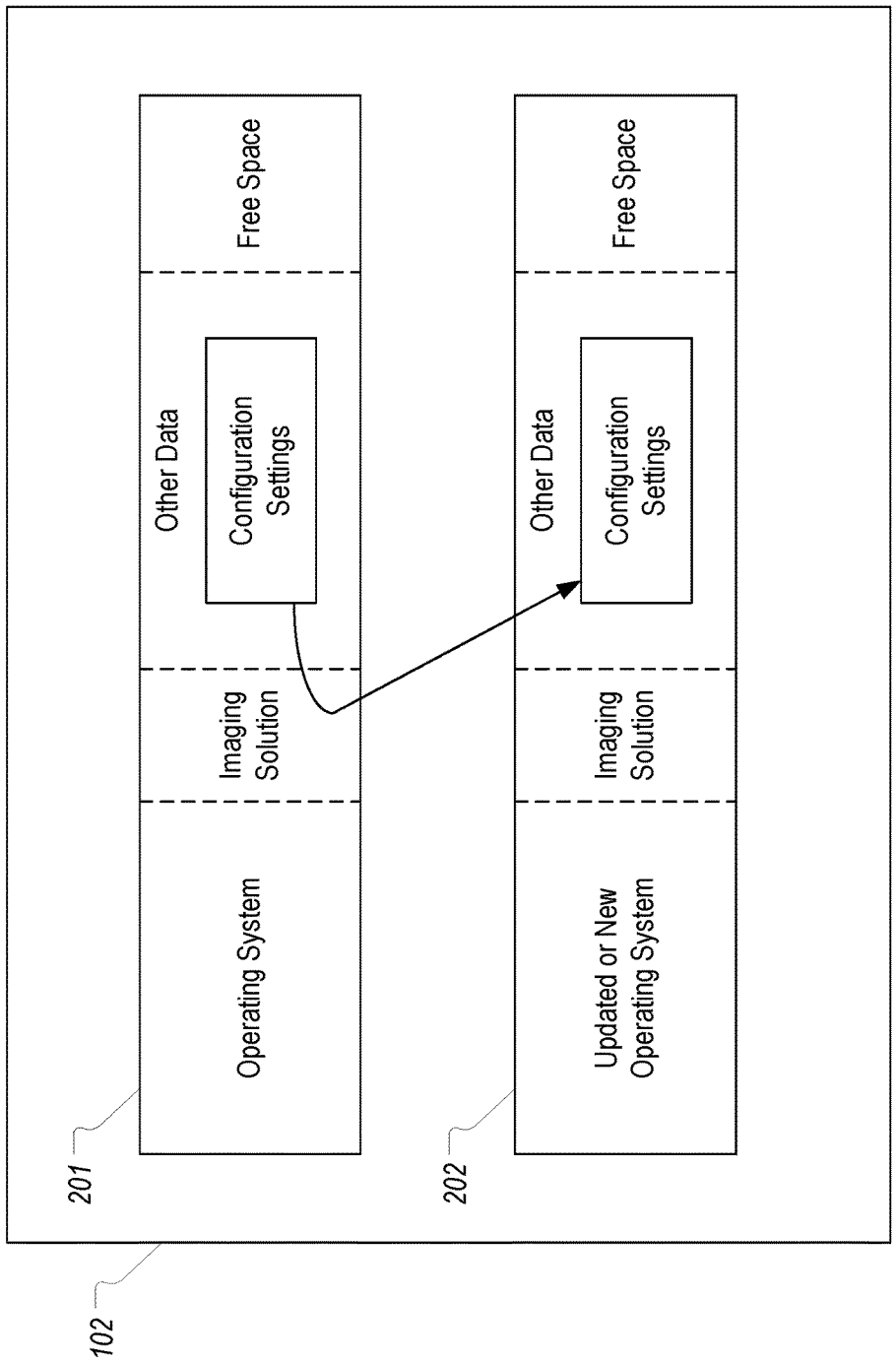
FIG. 4 illustrates how configuration settings can be automatically synchronized to a new image as part of the live imaging process to thereby customize the new image in accordance with customizations made to the current image.

As mentioned above, in some embodiments, the imaging solution may also be tasked with synchronizing a user's configuration settings to the new image. FIG. 4 represents how this can be accomplished. As shown, the image on drive 201 can include configuration settings which can represent any customization that has been made to the image on drive 201. When switching to the new image on drive 202 which may include an updated or new operating system, these customizations would otherwise be lost. However, in accordance with embodiments of the present invention, the imaging solution can identify the configuration settings on drive 201 and update the new image in accordance with these configuration settings. Although FIG. 4 depicts the configuration settings as being part of the "other data," the configuration settings can include a customization to any part of the image including the operating system. For example, these configuration settings can include registry settings in a Windows environment.

When the new image includes an updated version of the same operating system, the configuration settings from drive 201 can largely be copied directly to the new image on drive 202. However, when the new image includes a new operating system, the imaging solution may need to adapt at least some of the configuration settings to the new operating system. For example, if the new operating system employs a different registry key to perform a particular customization that was made on drive 201, the imaging solution can modify the corresponding configuration setting when writing it to drive 202 so that it accomplishes the same or similar customization in the new operating system. In some embodiments, these configuration settings could be stored in a remote repository rather than on drive 201. In such cases, the imaging solution can access the remote repository to obtain the configuration settings and then modify the new image to synchronize these configuration settings to the new or updated operating system.

To summarize, a client device can include at least two drives that are alternately employed to store the active OS partition. An imaging solution that executes on the active OS partition on one drive can perform a live imaging process in which another drive is fully imaged while the user continues to use the client device. This live imaging process can even include configuring the new image to automatically activate an updated operating system or to customize the new image in accordance with a user's existing configuration settings on the currently active drive.

Although the above description relates to embodiments where client device 102 includes two drives that are alternately employed to store the active OS partition, the present invention can also be implemented when a client device 102 includes a single drive that can store an active OS partition. In such cases, this single drive can be divided into two sets of one or more partitions that alternately store the active OS partition in substantially the same way as described above.

Figure 5A:
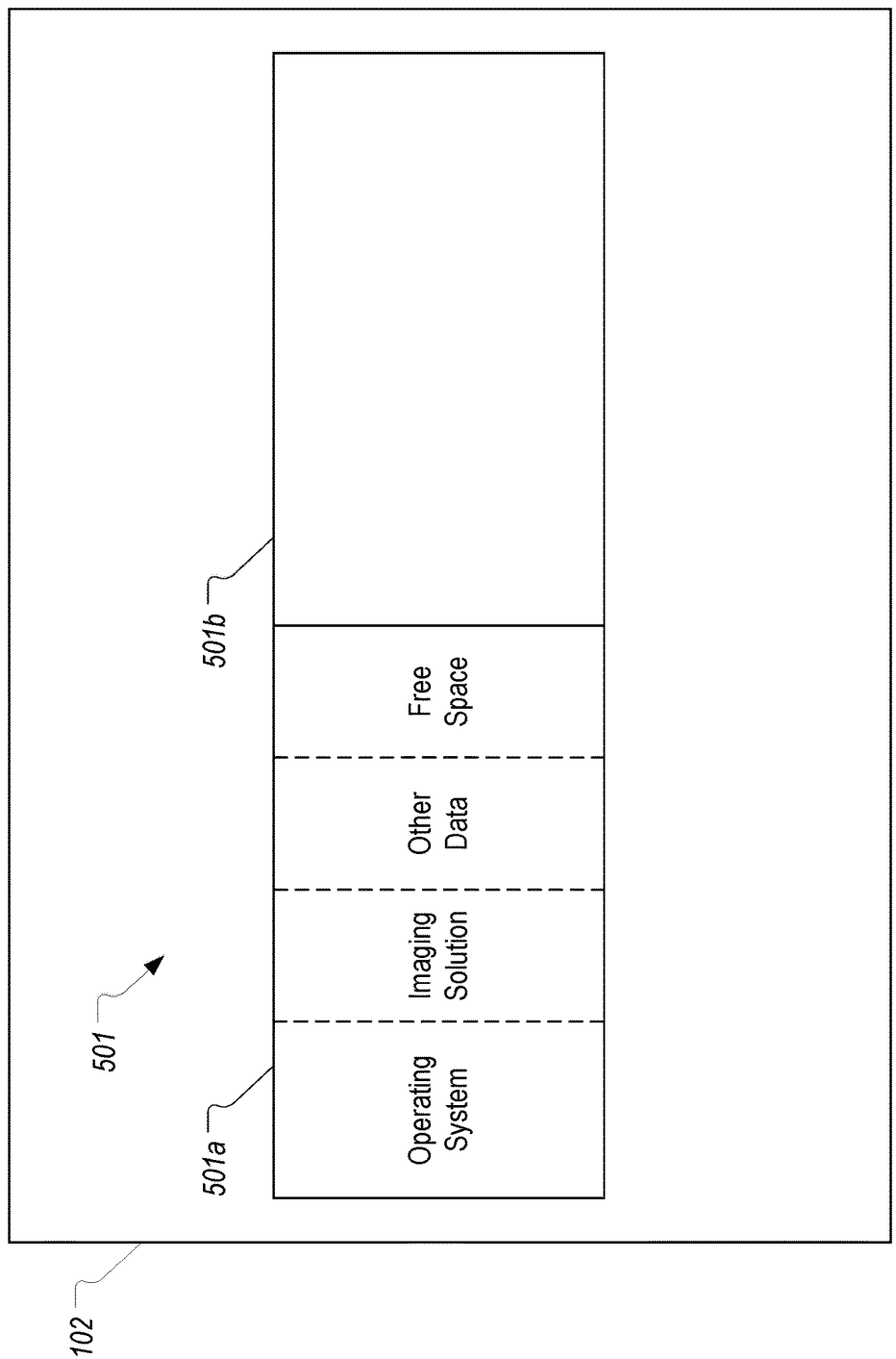
FIGS. 5A-5C illustrate how the live imaging process of the present invention can be implemented to image a second partition of a drive with a new operating system while the operating system on a first partition of the same drive is executing.
Figure 5B:
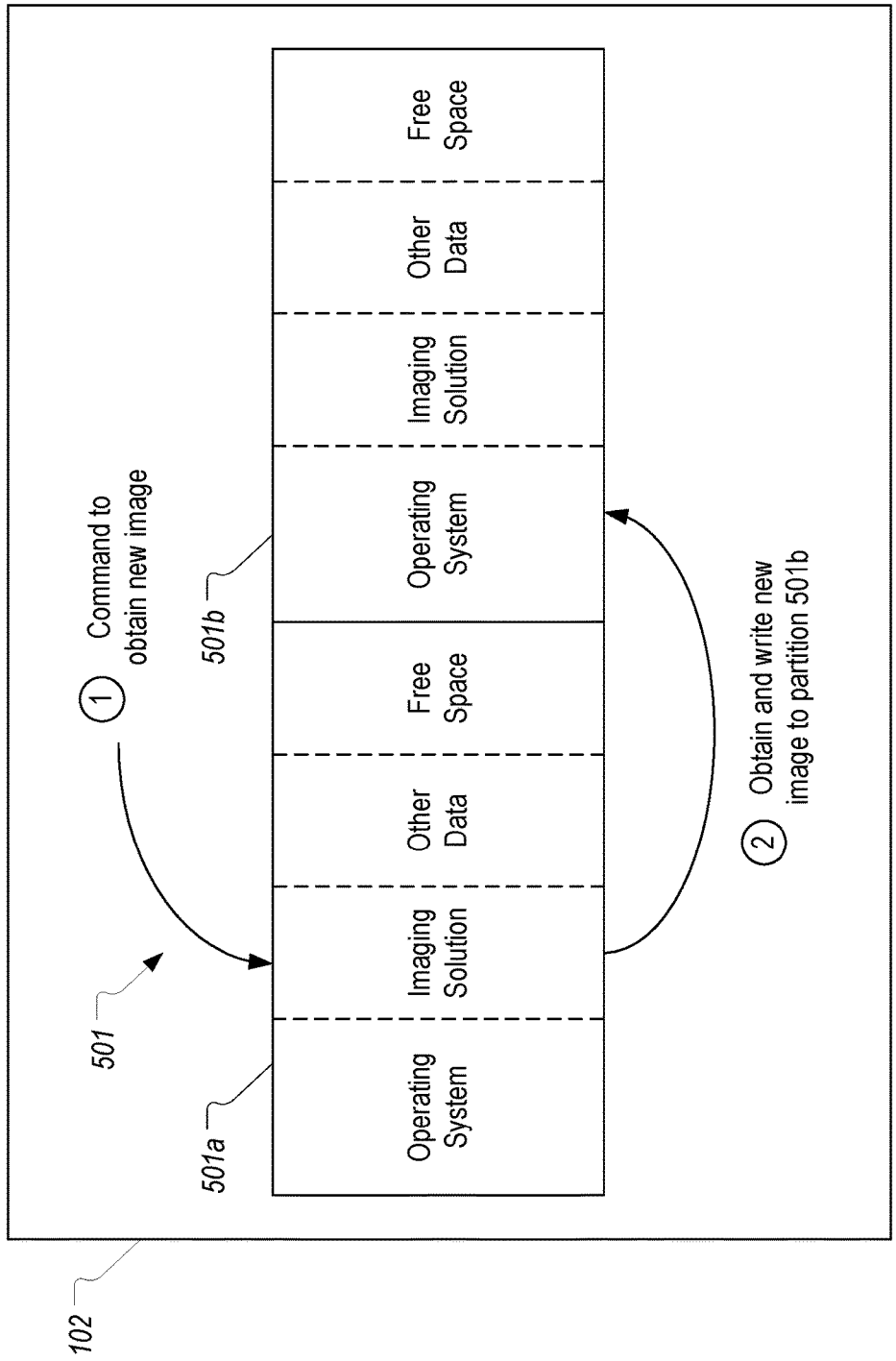
Figure 5C:
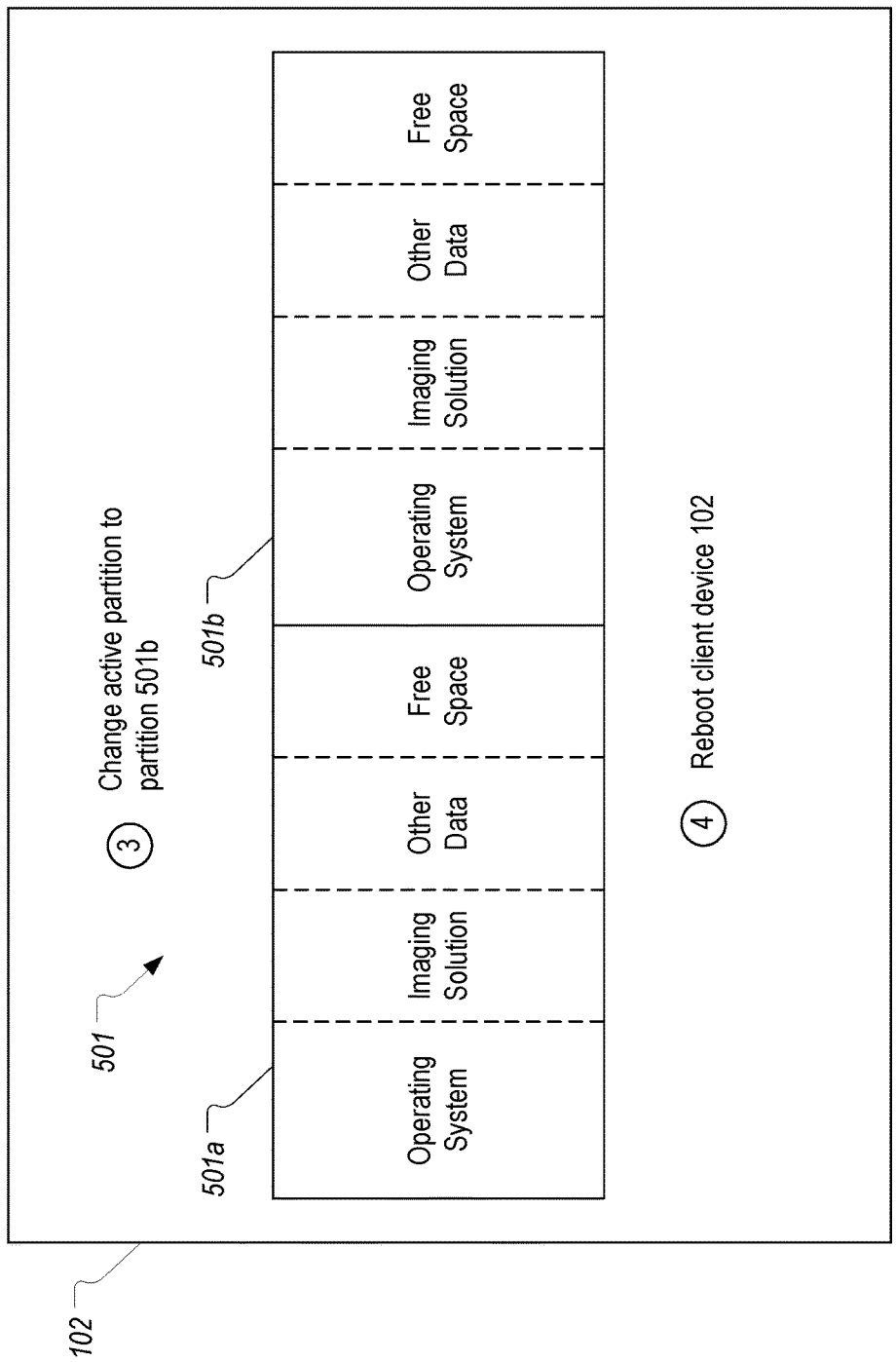

FIGS. 5A-5C generally represent how the present invention can be implemented when a client device does not have two available drives. As shown, client device 102 includes a drive 501 that is divided into at least two sets of partitions, including set 501a and set 501b. Each of sets 501a and 501b can include at least one partition. Both sets 501a and 501b can be large enough to store an image that includes an operating system (e.g., each set can include a partition that is large enough to store the operating system in an image that may be written to the set).

FIG. 5A, like FIG. 2A, represents the case where set 501a includes the active OS partition. Set 501a will therefore include an operating system, an imaging solution, other data, and possibly free space. Although set 501b is shown as being empty, this need not necessarily be the case. Then, as shown in FIG. 5B, when it is desired to update client device 102 with a new image, a command can be sent to the imaging solution that is executed by the operating system on set 501a instructing the imaging solution to obtain the new image.

In response, the imaging solution can obtain the new image and write it to set 501b. This new image includes an updated or new operating system, an imaging solution, other data, and possibly free space. Also, as part of writing the new image to set 501*b*, the imaging solution on set 501*a* can take any of the additional steps described above to activate, register, customize, etc. the operating system or any other component in the new image.

Finally, as shown in FIG. 5C, with the new image written to set 501*b*, the imaging solution on set 501*a* can change the active partition to the partition in set 501*b* that stores the operating system and then reboot client device 102 thereby causing client device to boot from set 501*b*. Accordingly, although it may be preferred to implement the present invention in a client device that includes at least two drives, it is also possible to do so in client devices with a single available drive.

FIG. 6 illustrates a flowchart of an example method 600 for performing live imaging of a client device. As an example, method 600 can be performed on client device 102 by the imaging solution that is executed on the operating system installed on drive 201. Alternately, method 600 can be performed on client device 102 by the imaging solution that is executed on the operating system installed on set 501*a* of drive 501.

Method 600 includes an act 601 of, while a first operating system that is included in a first image on a first set of one or more partitions of a drive of the client device is executing, obtaining, by an imaging solution that is executed by the first operating system, a second image that includes a second operating system. For example, the imaging solution on drive 201 or set 501*a* can obtain a new image that includes a new or updated operating system.

Method 600 includes an act 602 of, while the first operating system continues to execute, writing the second image to a second set of one or more partitions of a drive of the client device to cause the second set of one or more partitions to be capable of booting the second operating system. For example, the imaging solution on drive 201 or set 501*a* can write the new image to drive 202 or set 501*b* to enable client device 102 to boot from drive 202 or set 501*b*.

Method 600 includes an act 603 of, while the first operating system continues to execute, updating the client device to cause the client device to boot from the second set of one or more partitions. For example, the active partition on client device 102 can be changed from the partition of drive 201 containing the active operating system to the partition of drive 202 containing the new or updated operating system or from a partition in set 501*a* containing the operating system to a partition in set 501*b* containing the operating system.

Method 600 includes an act 604 of rebooting the client device to cause the second operating system to be executed. For example, client device 102 could be rebooted to cause the operating system on drive 202 or set 501*b* to be executed.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing live imaging of a client device comprising:

while a first operating system that is included in a first image on a first set of one or more partitions of a drive of the client device is executing, obtaining, by an imaging solution that is executed by the first operating system, a second image that includes a second operating system;

while the first operating system continues to execute, writing the second image to a second set of one or more partitions of a drive of the client device to cause the second set of one or more partitions to be capable of booting the second operating system, wherein writing the second image includes:

accessing one or more registry keys to obtain one or more configuration settings that are currently employed by the executing first operating system to customize one or more components included in the first image, and modifying one or more registry keys defined in the second image in accordance with the one or more configuration settings such that the one or more configuration settings will be applied to customize corresponding one or more components included in the second image when the second operating system is executed on the client device;

while the first operating system continues to execute, updating the client device to cause the client device to boot from the second set of one or more partitions; and rebooting the client device to cause the second operating system to be executed.

2. The method of claim 1, wherein the client device includes at least two drives, and the first set of one or more partitions are on a different drive from the second set of one or more partitions.

3. The method of claim 1, wherein the second operating system is an upgraded version of the first operating system.

4. The method of claim 1, wherein the second operating system is a different operating system than the first operating system.

5. The method of claim 1, wherein the one or more components included in the first image include the first operating system or one or more applications contained in the first image.

6. The method of claim 1, wherein the second operating system is a different operating system than the first operating system, and wherein modifying one or more registry keys defined in the second image in accordance with the one or more configuration settings comprises adapting at least one of the one or more configuration settings to correspond to the different operating system.

7. The method of claim 1, wherein modifying one or more registry keys defined in the second image comprises adding at least one registry key to the second image.

8. The method of claim 1, further comprising:
while the first operating system continues to execute, notifying a user of the client device that the second image has been written to the second set of one or more partitions and that the client device needs to reboot to complete the live imaging; and
wherein the client device is rebooted in response to user input.

9. The method of claim 1, wherein updating the client device to cause the client device to boot from the second set of one or more partitions comprises setting the second set of one or more partitions as the active partition.

10. The method of claim 1, wherein the imaging solution obtains the second image in response to user input to the client device.

11. A method for performing live imaging of a client device comprising:
while a first operating system that is included in a first image on a first set of one or more partitions of a drive of the client device is executing, obtaining, by an imaging solution that is executed by the first operating system, a second image that includes a second operating system;
while the first operating system continues to execute, writing the second image to a second set of one or more partitions of a drive of the client device to cause the second set of one or more partitions to be capable of booting the second operating system, wherein writing the second image includes:
identifying one or more configuration settings that are currently employed by the executing first operating system to customize one or more components included in the first image;
modifying the second image in accordance with the one or more configuration settings such that the one or more configuration settings will be applied to customize corresponding one or more components included in the second image when the second operating system is executed on the client device;
determining that the first and second operating systems are the same operating system and that the second operating system is an upgraded version of the first operating system;
identifying the licensing data that the first operating system employs to verify that the first operating system is licensed to execute on the client device; and
copying the licensing data to the second image for use by the second operating system to verify that the second operating system is licensed to execute on the client device;
while the first operating system continues to execute, updating the client device to cause the client device to boot from the second set of one or more partitions; and
rebooting the client device to cause the second operating system to be executed.

12. The method of claim 11, wherein the licensing data is used to activate the second operating system.

13. One or more computer storage media storing computer executable instructions which when executed on a client device implement a method for performing live imaging of the client device, the method comprising:
obtaining, by an imaging solution that is executed on a first operating system that is installed on a first set of one or more partitions of a drive of the client device, a new image that includes a second operating system;
writing, by the imaging solution, the second image to a second set of one or more partitions of a drive of the client device to cause the second set of one or more partitions to be capable of booting the second operating system, wherein writing the second image includes:
accessing one or more registry keys to obtain one or more configuration settings that are currently employed by the executing first operating system to customize one or more components included in the first image, and
modifying one or more registry keys defined in the second image in accordance with the one or more configuration settings such that the one or more configuration settings will be applied to customize corresponding one or more components included in the second image when the second operating system is executed on the client device; and
causing, by the imaging solution, the client device to reboot from the second set of one or more partitions such that the second operating system is executed.

14. The computer storage media of claim 13, wherein writing the second image to the second set of one or more partitions comprises:
identifying licensing data employed by the first operating system; and
copying the licensing data to the second image for use by the second operating system such that the licensing data will be applied when the second operating system is executed on the client device.

15. The computer storage media of claim 13, wherein writing the second image includes adding one or more registry keys to the second image.

16. A client device comprising:
a first drive containing a first image, the first image including a first operating system and an imaging solution;
a second drive; and one or more processors configured to execute the first operating system;

wherein, while the first operating system is executed, the imaging solution obtains and writes a second image containing a second operating system to the second drive to cause the client device to be capable of rebooting directly from the first operating system to the second operating system, and wherein as part of writing the second image, the imaging solution also:

accesses one or more registry keys to obtain one or more configuration settings that are currently employed by the executing first operating system to customize one or more components included in the first image, and modifies one or more registry keys defined in the second image in accordance with the one or more configuration settings such that the one or more configuration settings will be applied to customize corresponding one or more components included in the second image when the second operating system is executed on the client device.

17. The client device of claim 16, wherein the imaging solution also modifies the second image to include licensing data that was employed by the first operating system.

18. The client device of claim 16, wherein the imaging solution also adds one or more registry keys to the second image.

19. The client device of claim 16, wherein, upon writing the second image to the second drive, the imaging solution updates an active partition of the client device from a partition of the first drive where the first operating system is stored to a partition of the second drive where the second operating system is stored.

* * * * *